Dec. 5, 1961  E. V. BLOOMQUIST  3,011,430
ORANGE JUICE EXTRACTOR
Filed Feb. 2, 1959

INVENTOR.
EVERT V. BLOOMQUIST
BY
Lowell & Henderson
ATTORNEY'S

United States Patent Office 3,011,430
Patented Dec. 5, 1961

3,011,430
ORANGE JUICE EXTRACTOR
Evert V. Bloomquist, Wausau, Wis., assignor to Bloomquist Machine Manufacturing Company, Wausau, Wis., a partnership
Filed Feb. 2, 1959, Ser. No. 790,446
1 Claim. (Cl. 100—98)

This invention relates generally to an appliance for extracting juice from fruit such as oranges, and more particularly to a method and apparatus for extracting juice from oranges.

It is an object of this invention to provide an improved method and apparatus for extracting juice from a fruit.

Another object of this invention is to provide a juice extractor wherein the juice is extracted primarily by a pressure effected from within the fruit.

A further object of this invention is to provide a juice extractor wherein the fruit is moved through a continually narrowing passage, with an incision being made in the peel of the fruit during such movement whereby the internal pressure effected within the fruit initially forces the juice from the fruit.

It is another object of this invention to provide a method wherein a fruit such as an orange is subjected to a gradually increasing squeezing pressure and the peeling is cut before the orange bursts so that the juice is released by the internal pressure effected within the orange rather than by an externally applied pressure which could extract the bitter juice portions of the peeling into the orange juice.

Yet another object is to provide a juice extractor which is simple in construction, efficient in operation, and readily transportable for convenience of use.

These objects and other features and advantages of the invention will become readily apparent from the following description when taken in conjunction with the accompanying drawing, wherein.

Figure 1:
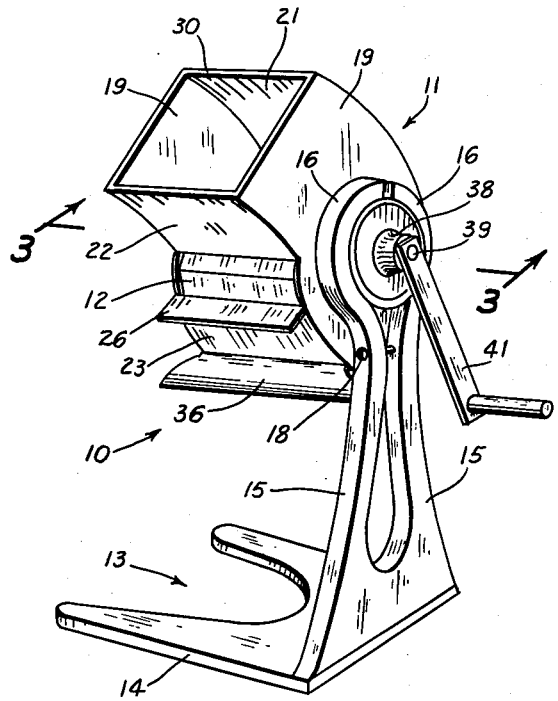
FIG. 1 is a perspective view of one embodiment of the juice extracting apparatus of the present invention.
Figure 2:
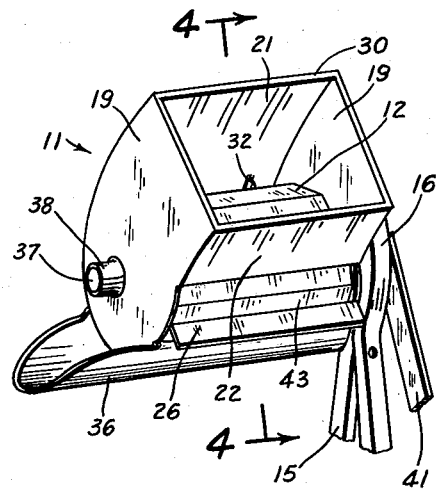
FIG. 2 is a fragmentary perspective view of the apparatus taken from an angle different than that of FIG. 1.

Referring to the drawing, the juice extracting apparatus of this invention is indicated generally at 10 in FIG. 1, and is comprised of a housing or hopper 11 open at the top, a drum 12 rotatably mounted within the hopper 11, and a stand 13 for supporting the hopper.

Figure 3:
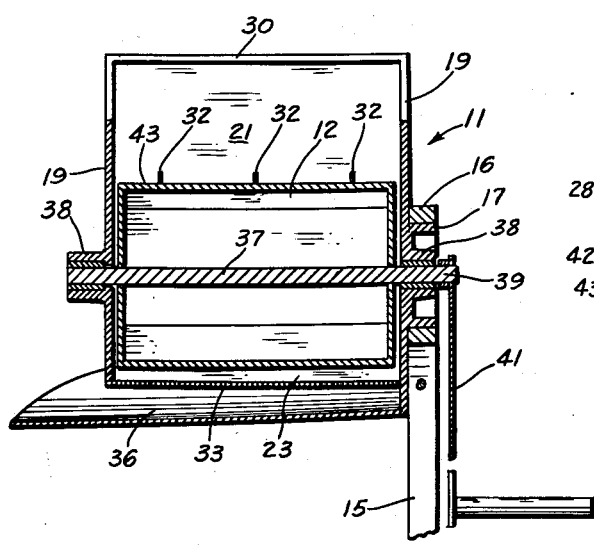
FIG. 3 is an enlarged sectional view taken along the line 3—3 in FIG. 1.

The stand 13 includes a U-shaped base 14 on which a pair of upstanding legs 15 are mounted. The upper portions 16 of the legs form a split ring for clamping engagement with a circular flange 17 (FIG. 3) formed on the hopper 11. A screw 18 (FIG. 1) is inserted through the legs for drawing the split ring portions 16 toward each other and about the flange 17.

Spaced above the base 14, whereby a container (not shown) or the like may be received therebetween, the hopper 11 is formed by a pair of substantially U-shaped, longitudinally spaced end walls 19, transversely spaced side walls 21 and 22, and a semi-circular bottom wall 23. As best illustrated in FIG. 4, the side wall 21 and the bottom wall 23 are integral, while the side wall 22 is cut away at one end of the bottom wall to form a protruding lip portion 26 and an opening 27 in the hopper 11.

Figure 4:
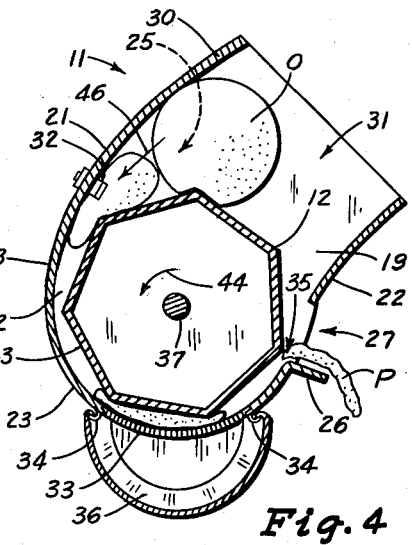
FIG. 4 is an enlarged sectional view taken along the line 4—4 in FIG. 2, and showing changed positions of an orange as it is processed.

For the purpose of convenience of description, the integral side wall 21 and the bottom wall 23 shall be designated hereinafter as the main wall 28 (FIG. 4). The bottom wall 23 is semi-circular and the side wall 21 is continuous with the curve of the bottom wall 23 but in a tangential manner, so that the main wall 28 is of a convolute curvature, as viewed in transverse cross section (FIG. 4) for a purpose to be described hereinafter.

It is noted that the upper end 30 of the main wall 28 defines a portion of the opening 31 formed at the top of the housing 11 and that one or more inwardly extended cutting knives 32 is secured to the main wall 28 downwardly of the upper end 30. As is clearly illustrated in FIGURE 4, the knives 32 extend inwardly of the wall 28 less than half the distance between the wall and the surface of the drum 12. The actual length of the knives is that which is sufficient to slice through the peel only on one side of the piece of fruit undergoing a squeezing action. The lowermost portion of the main wall includes a receivable screen 33, and secured to the bottom of the housing 11 on each side of the screen 33 are a pair of upturned flanges 34 on which a spout 36 may be slidably mounted.

Directly above the screen 33, the drum 12 is mounted on a shaft 37 which extends longitudinally on the axis about which the semi-circular bottom wall 23 is located. Each end of the shaft 37 is mounted in a bearing unit 38 formed on each end wall 19, and with a shaft end 39 being extended for connection with a handle 41 for rotating the shaft and the drum. The drum 12 has a polygonal shape in transverse cross-section, the present embodiment being seven sided. By the location of the drum shaft 37 on the bottom wall axis, it may readily be observed in FIG. 4 that by its relationship with the main wall 28, a passage 42 is formed between and defined by the irregular peripheral surface 43 of the drum 12 and the main wall 28, the passage 42 beginning at 25 (FIG. 4) adjacent the upper end 30 of the wall 28 and ending at 35 adjacent the opening 27. Importantly, as the circular drum 12 and the convolutely curved main wall 28 are formed about the same axes, the passage 42 is widest, or largest in cross sectional area, at its beginning 25 and continually narrows toward its ending 35.

In the operation of the juice extracting apparatus 10, a piece of fruit such as an orange O (FIG. 4) is inserted through the opening 31. By rotating the handle 41 in the direction of the arrow 44, the orange is caught between the irregular drum surface 43 and the main wall 28 adjacent its upper end 30 and at the beginning 25 of the passage. Further rotation of the handle 41 forces the orange in the direction of the arrow 46 whereby, as the passage 42 begins to narrow, continually increasing pressure is exerted upon the orange. Before, however, the orange is squeezed sufficiently between the main wall 28 and the drum surface 43 to cause it to burst, the orange is driven upon one or more of the cutting knives 32 which make an incision through the peel of the orange.

Thus, as the orange is cut before it bursts, it may be realized that the internal pressure effected within the orange forces the juice out of the orange, rather than an external squeezing pressure which could extract the bitter portions of the peel into the juice. Continued rotation of the handle 41 forces the orange further along the continually narrowing passage 42 with a continually increasing squeezing pressure being therefore applied to complete the extraction of the juice from the orange without, however, sufficient pressure being applied to extract any of the bitter juices from the peelings. The peelings P (FIG. 4) are then discharged through the opening 27.

As the screen 33 is placed at the lowermost portion of the main wall 28, it may readily be appreciated that the extracted juice will run to this portion and down through the screen onto the spout 36 for disposal. The screen 33 acts to separate the juice from the peeling and the seeds, the latter being readily removed after the juice extracting operation by removing and cleaning the screen and flushing out the housing 11.

It is seen, therefore, that the invention comprises a juice extracting apparatus wherein a fruit such as an orange is forced through a continually narrowing passage providing for a sequential compressing and cutting of the orange, and a separation of the juice from the seeds and peeling.

Although a preferred embodiment of the invention has been disclosed herein, it is to be noted that various modifications may be made without departing from the full scope of the invention, as defined by the appended claim.

I claim:

An apparatus for extracting juice from an orange or the like, comprising a housing having an opening for receiving oranges, said housing including side walls and end walls defining said opening adjacent the upper portion of the housing, said side and end walls further defining a second opening in said housing adjacent the lower portion of the housing, a screen connected with said walls across the second housing opening, said screen and the side walls of the housing in the lower portion of the housing being substantially semicircular in transverse section, one said side wall continuing upwardly of the housing with a convolute curvature, a polygonal drum, a shaft supported by the housing end walls to carry the drum for rotation within the housing, said shaft having an axis of rotation coincident with the axis of generation of the curvature of the lower semicircular housing portion, said drum, being thus carried by the shaft, forming with the side wall of convolute curvature a progressively narrowing passage from the upper portion of the housing toward the lower housing portion, said passage having an inlet end smaller than an orange and open to said opening, one or more knives secured to the inner surface of the side wall of convolute curvature at a position spaced inwardly from said passage inlet end and said knives extending less than half the distance from said side wall across the passageway, whereby an orange engaged by said drum is moved into and through said passage and is advanced between said drum and side wall to apply thereby a pressure to the interior of the orange below the bursting pressure thereof prior to being pierced by said knives through the peel on one side of the orange, and a spout connected with the side walls at the lower portion of the housing to receive all the juice from a pierced and pressed orange flowing through the screen.

References Cited in the file of this patent

UNITED STATES PATENTS

| | | |
|---|---|---|
| 598,150 | Howall | Feb. 1, 1898 |
| 1,985,323 | McCall | Dec. 25, 1934 |
| 2,515,748 | Wallace et al. | July 18, 1950 |
| 2,579,906 | Cook | Dec. 25, 1951 |
| 2,664,042 | Walker | Dec. 29, 1953 |
| 2,808,776 | Palmer | Oct. 8, 1957 |

FOREIGN PATENTS

| | | |
|---|---|---|
| 451,440 | Italy | Sept. 14, 1949 |